United States Patent [19]

Morag

[11] Patent Number: 4,713,651
[45] Date of Patent: Dec. 15, 1987

[54] INFORMATION DISPLAY SYSTEM

[76] Inventor: Meir Morag, 21 Shalom Asch Street, Tel Aviv, Israel

[21] Appl. No.: 843,079

[22] Filed: Mar. 24, 1986

[30] Foreign Application Priority Data

Mar. 29, 1985 [IL] Israel .................................. 74762

[51] Int. Cl.⁴ .............................................. G08B 23/00
[52] U.S. Cl. .................................... 340/407; 340/965
[58] Field of Search ............... 340/407, 945, 961, 965; 367/116

[56] References Cited

U.S. PATENT DOCUMENTS

| | | | |
|---|---|---|---|
| 3,157,853 | 11/1964 | Hirsch | 340/965 |
| 3,592,965 | 7/1971 | Diaz. | |
| 3,704,378 | 11/1972 | Robb | 340/407 |
| 3,835,476 | 9/1974 | Wysocki et al. | 340/407 |
| 3,923,370 | 12/1975 | Mostrom. | |
| 4,008,456 | 2/1977 | Ewart | 340/407 |
| 4,081,209 | 3/1978 | Heller et al. | |

FOREIGN PATENT DOCUMENTS 2261975 2/1974 Fed. Rep. of Germany.
2115179 9/1983 United Kingdom.

*Primary Examiner*—James L. Rowland
*Assistant Examiner*—Brian R. Tumm
*Attorney, Agent, or Firm*—Weingarten, Schurgin, Gagnebin & Hayes

[57] ABSTRACT

An information display system comprising tactile output stimulators for providing spatial or directional information relative to an operator's egocentric coordinate system.

5 Claims, 5 Drawing Figures

INFORMATION DISPLAY SYSTEM

FIELD OF THE INVENTION

The present invention relates to information output apparatus generally and more particularly to apparatus for providing information to an operator in non-visual form.

BACKGROUND OF THE INVENTION

There are known in the art a great variety of devices for providing information to an operator, such as the pilot of an airplane. These devices include visual displays, such as lighted control panels, heads-up displays, cathode ray tubes and the like, and audio displays, such as buzzers, horns, simulated speech and similar devices.

There exist operational environments wherein the amount of information which it is sought to provide to the operator exceeds that which can efficiently be received through visual and auditory senses. Such environments will be termed "information saturated" environments. An example of an information saturated environment is the cockpit of a modern high performance fighter aircraft. Overloading a given sense with information in an informations aturated environment may cause a decrease in performance.

There exist environments wherein an operator is required to respond immediately to information inputs which are spatially related to his position. The use of existing two-dimensional displays requires the operator mentally to transform the displayed information into his own three dimensional positional framework. Such a transformation requires concentration and takes time, and is therefore undesirable in an environment wherein extreme speed and accuracy of operator response are essential.

SUMMARY OF THE INVENTION

The present invention seeks to provide an information display system for displaying external information spatially related to the operator's position and is particularly useful in information saturated environments where fast and accurate operator responses are required. The term "display" is used throughout to refer to devices for presenting information which need not necessarily be in visual form. Thus the present invention relates to tactile displays.

There is thus provided in accordance with a preferred embodiment of the present invention, an information display system comprising tactile output means for providing spatial or directional information relative to an operator's egocentric coordinate system.

Additionally in accordance with a preferred embodiment of the present invention, the information display system comprises apparatus for receiving information signals, tactile output devices associated with the operator's head at a plurality of locations distributed thereon and corresponding to a plurality of directions in the framework of a coordinate system centered in the operator's head, this coordinate system being referred to as the operator's egocentric coordinate system for transmitting the information signals thereto, apparatus responsive to the received information signals and the directional characteristics thereof for actuating selected tactile output devices at locations corresponding to the directional characteristics of the received information.

Further in accordance with a preferred embodiment of the present invention, the tactile output means are supported by a helmet worn on the operator's head.

Additionally in accordance with an embodiment of the present invention, the system includes apparatus for sensing the orientation of the operator's head and for transposing the information signals to take into account the orientation of the operator's head to provide output indications of the received information in the operator's egocentric coordinate system.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
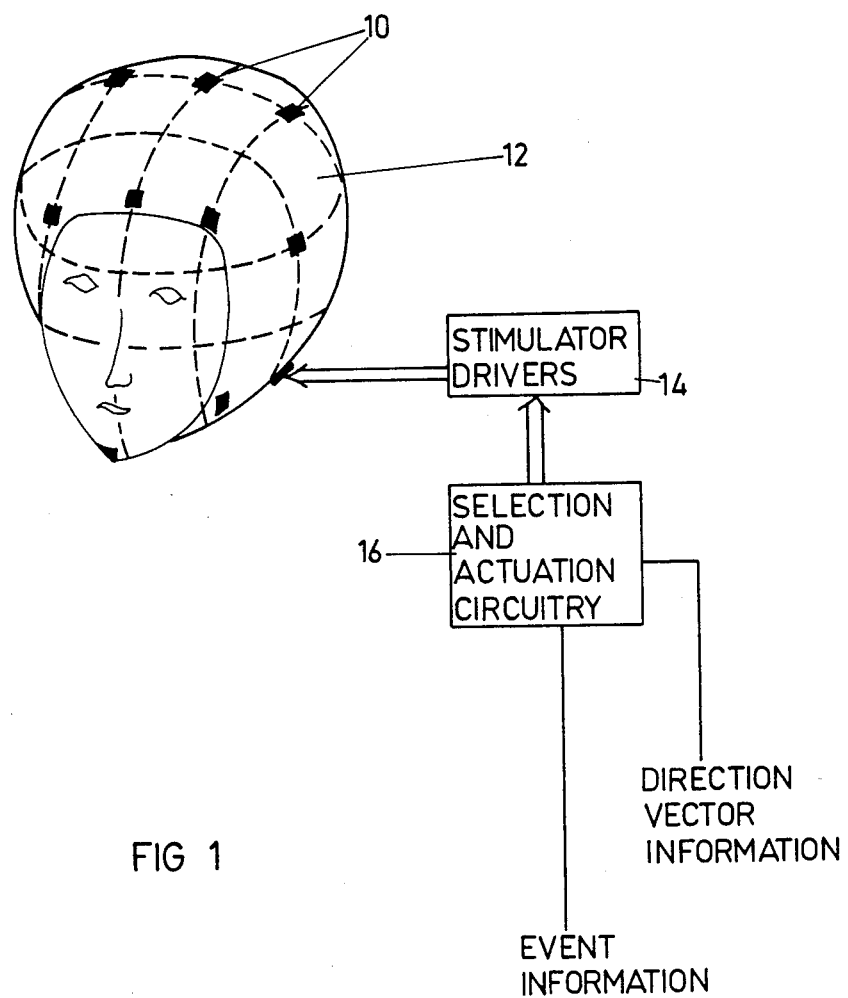
FIG. 1 is a part block diagram, part pictorial illustration of the information transfer system constructed and operative in accordance with the present invention.

Reference is now made to FIG. 1 which illustrates the information display system of the present invention in a general manner. An array of tactile output devices 10 is arranged about the head of an operator. The array of output devices is typically maintained in position by being mounted on a support enclosure 12 which is worn on the operator's head. Such support enclosure may comprise a fabric enclosure onto which the devices 10 are mounted or alternatively may comprise a protective helment, such as a pilot's helmet, or any other suitable mounting device.

The support enclosure 12 may be custom designed for each operator or may be standardized.

The tactile output devices 10 typically comprise tactile stimulators and are distributed over the skull of the operator so as to cover as wide a range of directions from the center of the skull in 360 degree space. Typical tactile output devices are mechanical stimulators such as push-pull miniature solenoids.

The tactile output devides are driven by drivers 14, typically power amplifiers, which are operative to provide electrical signals for actuation of individual tactile output devices in response to logic inputs. Drivers 14 are operated by tactile output device selection and actuation circuitry 16 which receives direction vector information and event information associated therewith and provides actuation logic outputs to appropriate drivers 14 in accordance with the information received.

Apparatus 16 is also operative to convert predetermined information into predetermined types of stimuli such that a given type of stimulus represents unabmiguously a particular type of information to the operator. For example, a pattern of 1 Hz pulse stimuli may indicate an approaching airplane, a pattern of 5 Hz pulse stimuli may indicate an approaching missile, a pattern of 20 Hz pulse stimuli may indicate a target which is in range, etc. Clearly the type of modulation of the stimuli is not limited to the number or frequency of pulses. It can comprise amplitude modulation, frequency modulation, a combination of both and any other suitable combination of modulations.

Figure 2:
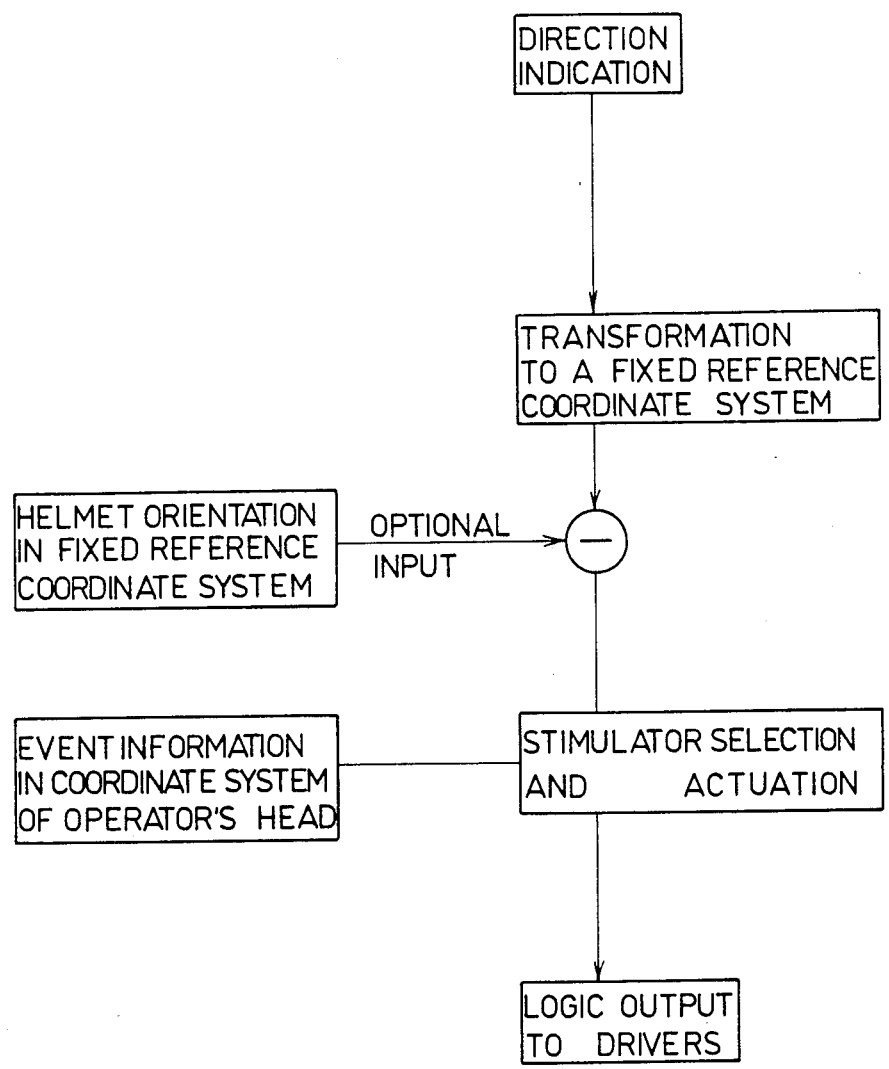
FIG. 2 is a simplified flow chart illustration of the operation of the apparatus of FIG. 1.

Reference is now made to FIG. 2 which is a generalized flow chart illustrating the operation of the apparatus of FIG. 1. A direction indication in a predetermined coordinate system is provided from conventional apparatus such as radar or any other direcitonal sensor and this indication is transformed to a coordinate system having a known (not necessarily constant) relationship with the operator's head, such as the coordinate system of an airplane cockpit.

Subtraction circuitry, which may be embodied in hardware, software, or a combination of the two, further transforms this transformed direction indication on the basis of input information supplied from a conventional helmet mounting sight which indicates the orientation of the operator's head in the reference system of coordaintes. A direction vector in the coordinate system of the operator's head corrected for head orientation is thus realized.

Information relating to events in the three dimensional space, which is provided from external sources such as radar and which has been transformed to the coordiante system of the operator's head provides appropriate logic output indications to the drivers for actuation of the tactiel output devices corresponding in location to the direction of the events in three dimensional space.

Figure 3:
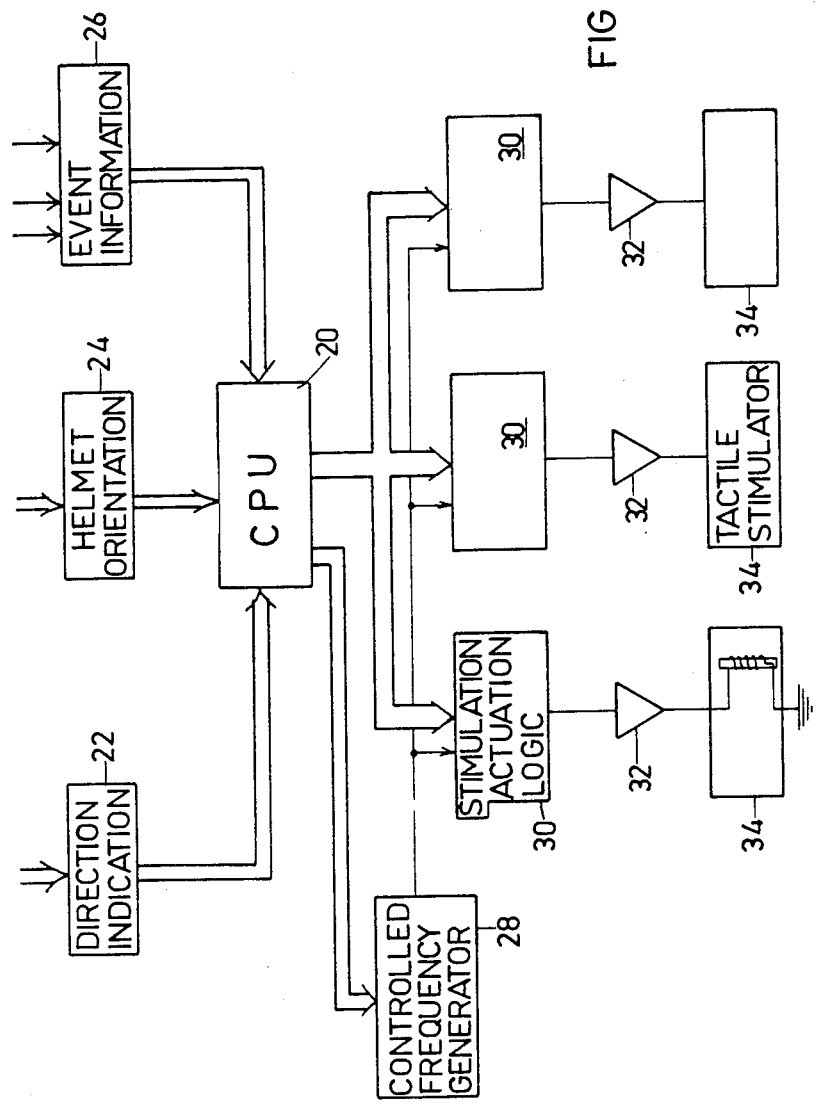
FIG. 3 is a simplified block diagram illustration of an information transfer system constructed and operative in accordance with a preferred embodiment of the present invention.

Reference is now made to FIG. 3, which illustrates stimulator selection and actuation circuitry 16 in block diagram form. Circuitry 16 comprises a CPU 20 such as an Intel 8051 which receives inputs via appropriate data busses from a direction indication interface circuit 22, a helmet orientation circuit 24 and an event information interface circuit 26. The CPU provides a frequency control output to a controlled frequency generator 28, and provides gain control and switching logic outputs to a multiplicity of stimulation actuation logic circuits 30, each of which is coupled to a corresponding stimulator driver 32. The output of each driver 32 is supplied to a tactile stimulator 34 which is arranged at a predetermined location relative to an operator's head.

It is appreciated that the information is transmitted to the operator by means of suitable amplitude and frequency modulation and the direction is indicated by actuation of one or more suitably located tactile stimulators.

Figure 4:
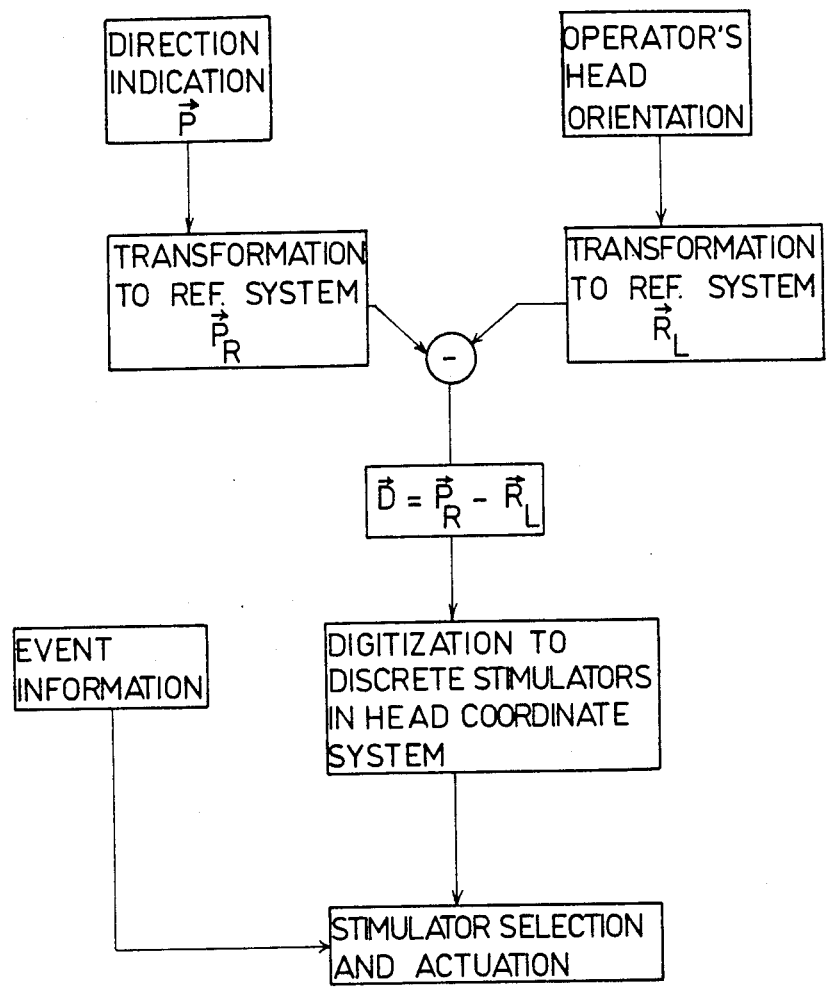
FIG. 4 is a simplified flow chart illustration of the operation of the apparatus of FIG. 3 according to one embodiment of the present invention.

Referring now to FIG. 4, the operation of the apparatus of FIG. 3 according to one embodiment of the invention may be understood as including the steps of receiving the direction indication P in an external coordinate system from input apparatus such as radar and conversion of the direction indication P to an indication $P_r$ in a relative coordinate system, such as the coordinate system of an airplane cockpit.

At the same time the orientation of the head of the operator is determined relative to the cockpit coordinate system as by a conventional helmet mounted sight such as the VITAS device manufactured by Honeywell, Inc. of the U.S.A.. This orientation information ($R_L$) is combined with the indication $P_r$ in a subtractor to provide a direction unit vector D in the coordinate system of the head of the operator, where D can be expressed as follows:

$$D = P_r - R_L$$

The information received from the detector apparatus is combined with the unit vector D preferably in digital form in order to provide actuation instructions for the various tactile stimulators in accordance with their locations and the received information corresponding to such locations.

Figure 5:
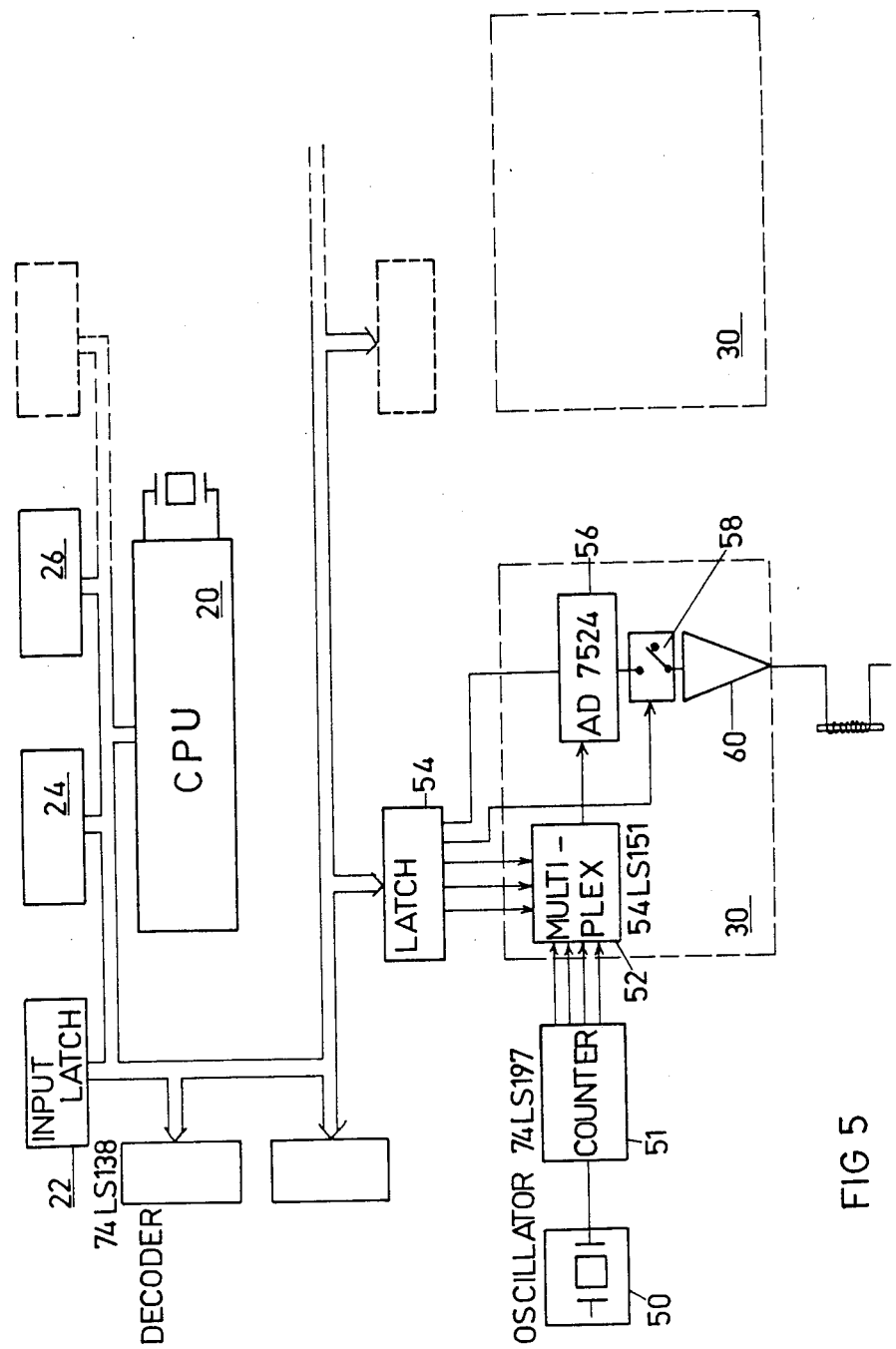
FIG. 5 is a somewhat more detailed block diagram illustration of the system of FIG. 3.

Reference is now made to FIG. 5 which illustrates a schematic illustration of the circuitry of FIG. 3. It is seen that the interfaces 22, 24 and 26 are embodied in respective latches which communicate with the CPU. The frequency generator comprises an oscillator 50 which outputs to a counter 51 such as a 74 LS 197.

The stimulator actuation logic 30 for each stimulator comprises a multiplexer 52, such as a 54 LS 151, which receives control inputs via a latch 54 in order to connect the stimulator drive circuitry to the selected frequency output from counter 51. The output of each multiplexer is supplied to a controlled amplifier 56 which outputs via a safety on-off switch 58, which is controlled by the CPU via latch 54. The output of switch 58 is provided via a power amplifier 60 (driver 32 of FIG. 3) to the corresponding tactile stimulator.

It will be appreciated by persons skilled in the art that the present invention is not limited to aircraft environments but has a wide range of applications, such as navigation by a driver of a land vehicle or an operator having limited vision.

It will also be appreciated by persons skilled in the art that the present invention is not limited by what has been particularly shown and described hereinabove. Rather the scope of the invention is defined only by the claims which follow.

I claim:

1. An information display system for providing event and direction indication information to an operator, comprising:
    means for receiving information signals having event and direction indication characteristics;
    means for transforming said received information signals into direction indications in a fixed reference coordinate system;
    an egocentric coordinate system centered in the head of the operator, and wherein spatial orientation of said egocentric coordinate system varies with spatial orientation of the head of the operator;
    means for transforming said direction indications in said fixed reference coordinate system to direction unit vectors in said egocentric coordinate system;
    a plurality of tactiel stimulators associated with the head of the operator to provide selected tactile stimuli thereto, and wherein said plurality of tactile stimulators are statically disposed generally omnidirectionally in 360 degree space about said egocentric coordinate system centered in the head of the operator and
    means responsive to said direction unit vectors in said egocentric coordinate system for actuating selected ones of said plurality of tactile stimulators at locations on the head of the operator corresponding to said event and direciton indication characteristic of said received information signals, thereby providing the operator with selected tactile stimuli corresponding to said event and direction indication information.

2. The information display according to claim 1 wherein said direciton indications transforming means further includes means for sensing the spatial orientation of said egocentric coordinate system centered in the head of the operator to take into account the spatial orientation of the head of the operator in transforming said direction indications in said fixed reference coordinate system to said direction unit vectors in said egocentric coordinate system.

3. The information display system according to claim 1 further comprising a support enclosure worn by the operator and wherein said plurality of tactile stimulators associated with the head of the operator are supported by said support enclosure worn on the head of the operator.

4. The information display according to claim 3 wherein said support enclosure worn on the head of the operator comprises a protective helment.

5. The information display system according to claim 1 wherein said means responsive to said direciton unit vectors in said egocentric coordinate system for actuating selected ones of said plurality of tactile stimulators at locations on the head of the operator is operative for actuating selected ones of said plurality of tactile stimulators corresponding in location to said direction indications of events in three dimensional space.

* * * * *